Oct. 14, 1930. W. J. SMITH ET AL 1,778,170
UNIVERSAL JOINT
Filed Aug. 29, 1928 2 Sheets-Sheet 1

Inventor
William J. Smith
Herman F. Braun
By Hull Broch & West
Attorney

Oct. 14, 1930.                W. J. SMITH ET AL                1,778,170
                                UNIVERSAL JOINT
                              Filed Aug. 29, 1928          2 Sheets-Sheet 2
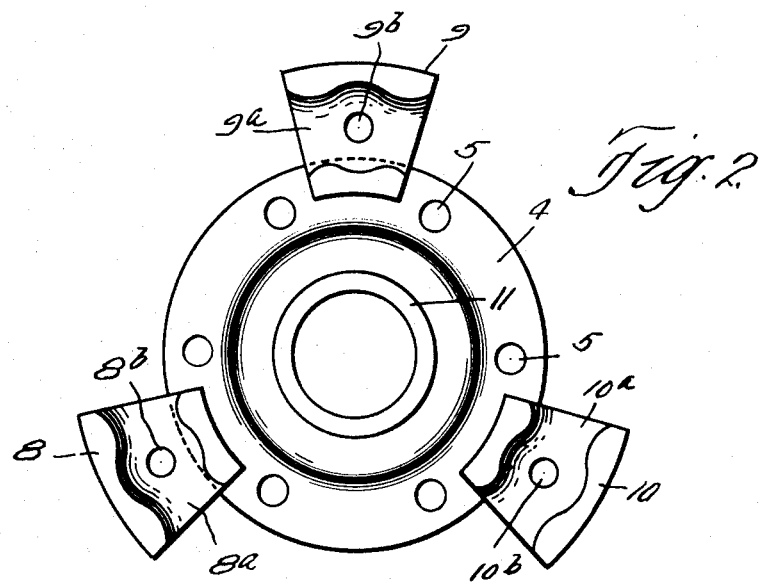
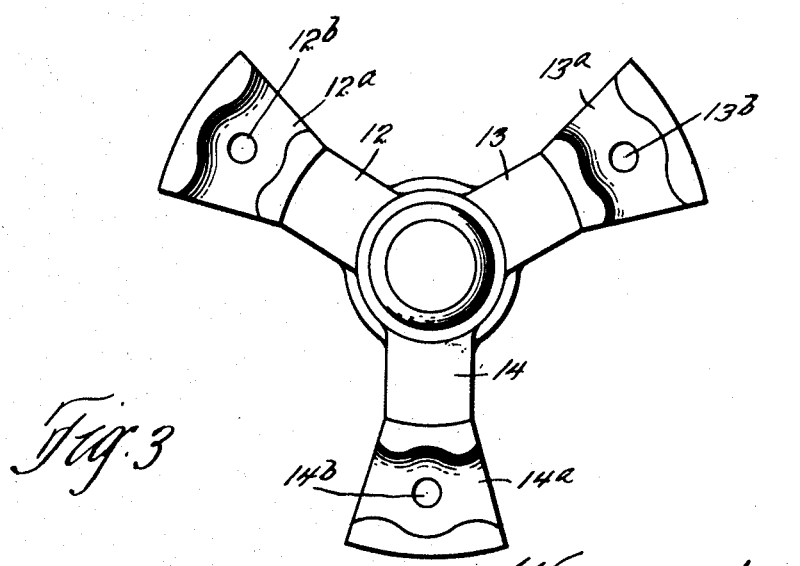

Patented Oct. 14, 1930

1,778,170

UNITED STATES PATENT OFFICE

WILLIAM J. SMITH AND HERMAN F. BRAUN, OF LAKEWOOD, OHIO, ASSIGNORS TO THE CLEVELAND STEEL PRODUCTS CORPORATION, OF CLEVELAND, OHIO, A CORPORATION OF OHIO

UNIVERSAL JOINT

Application filed August 29, 1928. Serial No. 302,754.

This invention relates to a universal joint or flexible coupling member for forming a driving connection between the adjacent ends of a pair of shafts and the main object of the invention is to provide a joint which is simple in construction, comprises comparatively few parts which are readily assembled and disassembled and which is well adapted for quantity production at comparatively low cost.

A further object of the invention is to provide a universal joint of the character described which requires a minimum amount of lubrication and which at the same time will be free from defects affecting the practicable and continuous operation of such joints.

Figure 1:
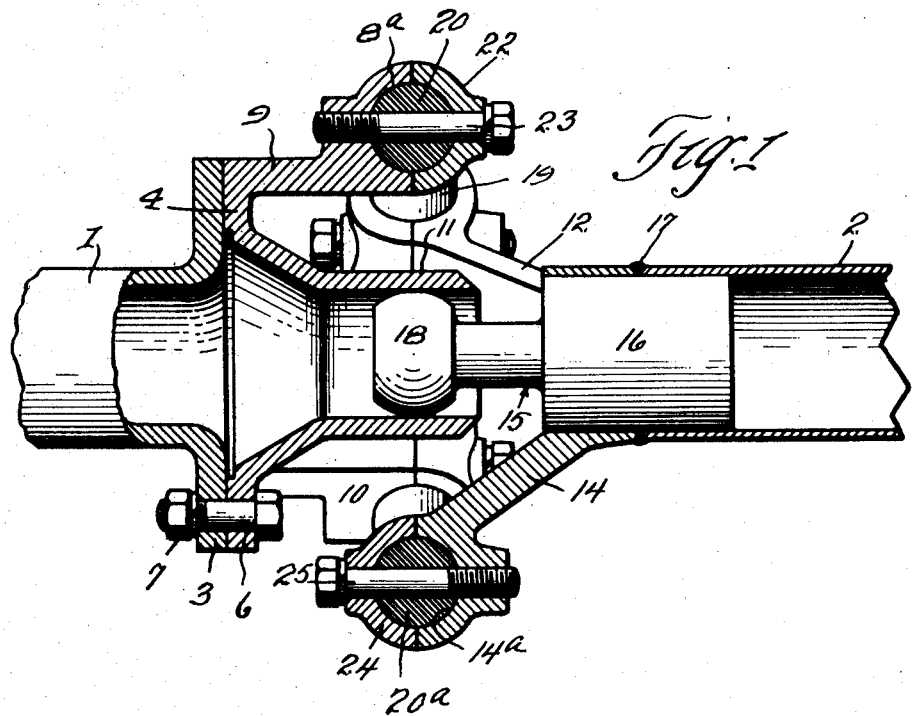
Figure 4:
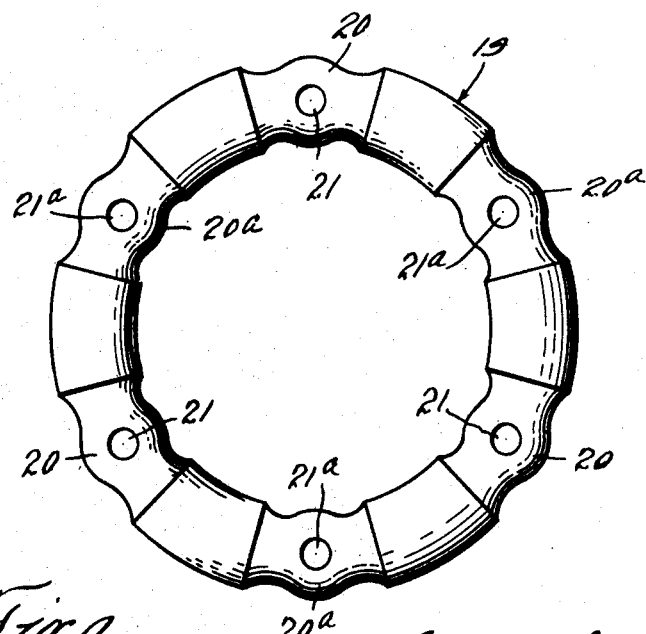

Further an more limited objects of the invention will appear as the description proceeds and by reference to the accompanying drawing in which Fig. 1 is a vertical sectional view illustrating the preferred embodiment of our invention; Fig. 2 is a view in end elevation of one of the hub sections; Fig. 3, is a view in end elevation of the other hub section; and Fig. 4 is a top plan view of the flexible member which provides a driving connection.

Referring now to the drawings, the reference characters 1 and 2 designate a pair of hub sections which are adapted to be rigidly connected with the adjacent ends of a pair of shafts between which a driving connection is to be provided. The hub section 1 has a peripheral flange 3 having apertures therein disposed about the periphery thereof and to which is rigidly connected an annular member 4 having a plurality of apertures 5 disposed about the periphery thereof and to which extend bolts 6 to which are secured nuts 7. The annular member 4 has a plurality of arms 8, 9 and 10 preferably integral therewith. The member 4 also has integral therewith a hollow annular extension 11, the purpose of which will hereinafter appear. The hub section 2 has integral therewith a plurality of arms 12, 13 and 14. Connected with the hub section 2 is a coupling member 15 having a cylindrical portion 16 which fits within the hub section 2 and is welded thereto about its entire periphery, as shown most clearly at 17. The opposite end of the coupling member 15 is in the form of a truncated sphere 18 which projects into the annular hollow projection 11 and has a working fit therein. The hollow projection 11 may be filled with a lubricant to furnish the necessary lubrication to the spherical member 15 which is the only portion of the joint which requires lubrication.

The arms 8, 9 and 10 at their outer ends are shaped to provide semi-spherical recesses $8^a$, $9^a$ and $10^a$ having bores $8^b$, $9^b$ and $10^b$ therein, respectively. The arms 12, 13 and 14 are shaped at their outer ends to provide recesses $12^a$, $13^a$ and $14^a$ having bores $12^b$, $13^b$ and $14^b$ therein respectively. An annular flexible member 19 forms a driving connection between the two hub sections. This flexible member 19 is made of rubber, rubber composition or some similar material and has spherical portions 20 and $20^a$ thereon spaced apart and provided with bores 21 and $21^a$, respectively. The arms 8, 9 and 10 are rigidly secured to the spherical portions 20 by means of semi-spherical caps 22 and threaded pins 23. The arms 12, 13 and 14 are rigidly secured to the spherical portions $20^a$ by means of semi-spherical caps 24 and threaded pins 25. The pins 23 and 25 extend through the bores 21 and $21^a$ respectively and firmly and rigidly connect the hub sections with the flexible member so as to form a driving connection therebetween and at the same time permits the two hub sections to be disposed at an angle to each other.

Various changes may be made in the details of construction and arrangement of parts without departing from the spirit of our invention and it should be understood that our invention is limited only in accordance with the scope of the appended claims.

Having thus described our invention, what we claim is:—

1. A universal joint including a flexible annular member having bulbous portions, a pair of shafts each carrying a plurality of arms, each arm having a gripping portion engaging one of said bulbous portions, each said gripping portion having a cavity conforming to the shape of said bulbous portions and receiving one of them, said gripping portions completely surrounding a portion of said annular member and having an enlarged central portion and flared ends.

2. A universal joint including a flexible annular member having bulbous portions, a pair of shafts each carrying a plurality of arms, each arm having a gripping portion engaging one of said bulbous portions, each said gripping portion having a cavity conforming to the shape of said bulbous portions and receiving one of them, said gripping portions completely surrounding a portion of said annular member and having an enlarged central portion and flared ends, said annular member being circular in cross section at every point.

3. A universal joint including a flexible annular member having bulbous portions, a pair of shafts each carrying a plurality of arms, each arm having a gripping portion engaging one of said bulbous portions, each said gripping portion having a cavity conforming to the shape of said bulbous portions and receiving one of them, said gripping portions completely surrounding a portion of said annular member and having an enlarged central portion and flared ends, one of said shafts carrying a tubular guiding portion and the other a cooperating, truncated, spherical guide member.

4. A universal joint including a flexible annular member having bulbous portions, a pair of shafts each carrying a plurality of arms, each arm having a gripping portion engaging one of said bulbous portions, each said gripping portion having a cavity conforming to the shape of said bulbous portions and receiving one of them, said gripping portions completely surrounding a portion of said annular member and having an enlarged central portion and flared ends, said annular member being circular in cross section at every point, one of said shafts carrying a tubular guiding portion and the other a cooperating, truncated, spherical guide member.

In testimony whereof, we hereunto affix our signatures.

WILLIAM J. SMITH.
HERMAN F. BRAUN.